United States Patent
Furuta et al.

(10) Patent No.: US 8,086,830 B2
(45) Date of Patent: Dec. 27, 2011

(54) ARITHMETIC PROCESSING APPARATUS

(75) Inventors: Takeshi Furuta, Kyoto (JP); Hideshi Nishida, Hyogo (JP); Takeshi Tanaka, Osaka (JP)

(73) Assignee: Panasonic Corporation, Osaka (JP)

(*) Notice: Subject to any disclaimer, the term of this patent is extended or adjusted under 35 U.S.C. 154(b) by 996 days.

(21) Appl. No.: 11/720,899

(22) PCT Filed: Aug. 24, 2005

(86) PCT No.: PCT/JP2005/015361
§ 371 (c)(1),
(2), (4) Date: Jun. 5, 2007

(87) PCT Pub. No.: WO2006/112045
PCT Pub. Date: Oct. 26, 2006

(65) Prior Publication Data
US 2009/0228691 A1    Sep. 10, 2009

(30) Foreign Application Priority Data

Mar. 31, 2005  (JP) ................................. 2005-104107

(51) Int. Cl.
G06F 15/80 (2006.01)
G06F 9/302 (2006.01)
G06F 9/305 (2006.01)

(52) U.S. Cl. ............ 712/234; 712/22; 712/221; 712/224

(58) Field of Classification Search .................... 712/22, 712/234, 221, 224
See application file for complete search history.

(56) References Cited

U.S. PATENT DOCUMENTS

| | | | | |
|---|---|---|---|---|
| 5,349,671 A | * | 9/1994 | Maeda et al. | 712/234 |
| 5,418,917 A | * | 5/1995 | Hiraoka et al. | 712/234 |
| 5,430,854 A | * | 7/1995 | Sprague et al. | 712/236 |
| 5,537,562 A | * | 7/1996 | Gallup et al. | 712/234 |
| 5,659,722 A | * | 8/1997 | Blaner et al. | 712/234 |
| 5,815,680 A | | 9/1998 | Okumura et al. | |
| 6,041,399 A | | 3/2000 | Terada et al. | |
| 6,317,824 B1 | * | 11/2001 | Thakkar et al. | 712/222 |
| 2002/0083311 A1 | | 6/2002 | Paver | |
| 2002/0114529 A1 | | 8/2002 | Horie | |

(Continued)

FOREIGN PATENT DOCUMENTS

EP    0682309    11/1995

(Continued)

OTHER PUBLICATIONS

English language Abstract of JP 4-096133.

(Continued)

*Primary Examiner* — Daniel Pan
(74) *Attorney, Agent, or Firm* — Greenblum & Bernstein, P.L.C.

(57) ABSTRACT

An arithmetic processing apparatus capable of performing an arithmetic operation for generating a condition flag commonly referred to by using a condition flag generated on an arithmetic operation unit basis in as few steps as possible is provided. The arithmetic processing apparatus, which processes multiple data in parallel based on single instruction, includes: processing elements capable of performing a common arithmetic operation based on the evaluation result of the instruction stored in the instruction register; and a condition flag arithmetic operation unit capable of performing one of the logical operation and the comparison operation on the condition flag retained in each processing element, transferring the operation result to each processing element, and updating the condition flag based on the operation result.

8 Claims, 7 Drawing Sheets

U.S. PATENT DOCUMENTS

2004/0070526 A1    4/2004  Horie
2004/0107333 A1*   6/2004  Drabenstott et al. ............ 712/22

FOREIGN PATENT DOCUMENTS

| JP | 1-116828    | 5/1989 |
| JP | 4 096133    | 3/1992 |
| JP | 5-189585    | 7/1993 |
| JP | 9 198231    | 7/1997 |
| JP | 10 27102    | 1/1998 |
| JP | 2000 047998 | 2/2000 |
| JP | 2001-265592 | 9/2001 |
| JP | 2004 062401 | 2/2004 |
| JP | 2004-334297 | 11/2004 |

OTHER PUBLICATIONS

English language Abstract of JP 9-198231.
English language Abstract of JP 2004-062401.
English language Abstract of JP 2000-047998.
English language Abstract of JP 10-27102.
English language Abstract of JP 2004-334297, Nov. 25, 2004.
English language Abstract of JP 1-116828, May 9, 1989.
English language Abstract of JP 5-189585, Jul. 30, 1993.
English language Abstract of JP 2001-265592, Sep. 28, 2001.

* cited by examiner

```
if ( a > 5 ) begin
b=b+c;
end
b=b+1;
```

FIG. 2B

| 001 | | cmpgt C0,R0,5; |
| 002 | | cfand C0,C0; |
| 003 | [C0] | add R2,R2,R1 |
| 004 | | add R2,R2,1 |

FIG. 3A

```
if ( a > 5 ) begin
b=b+c;
end
b=b+1;
```

FIG. 3B

| 001 |      | cmpgt | R0,5;    |
|-----|------|-------|----------|
| 002 |      | br    | $1       |
| 003 |      | add   | R2,R2,R1 |
| 004 | $1:  | add   | R2,R2,1  |

```
if ( a > 5 ) begin
b=b+c;
end
b=b+1;
```

FIG. 5B

| 001 |        | cmpgt  C0,R0,5;    |
|-----|--------|--------------------|
| 002 | [C0]   | br.all label1;     |
| 003 |        | add    R2,R2,R1    |
| 004 | label1:| add    R2,R2,1     |

ARITHMETIC PROCESSING APPARATUS

TECHNICAL FIELD

The present invention relates to an arithmetic processing apparatus, and particularly to a Single Instruction Multiple Data (SIMD) type arithmetic processing apparatus that includes a condition flag register.

BACKGROUND ART

In conventional arithmetic processing apparatuses, SIMD type arithmetic processing apparatuses for processing multiple data in parallel conforming to single instruction have been introduced. These arithmetic processing apparatuses are capable of processing multiple data in parallel by one instruction control device, shortening the processing execution time and improving the data processing capability (e.g. see Patent Reference 1).

In addition to such high speed processing, there is a pipeline type arithmetic processing apparatus capable of dividing the arithmetic operation processing itself into multiple stages in time series, each of multiple independent stages performing arithmetic operations serially. This arithmetic processing apparatus is known to be capable of exerting the maximum performance when instruction words are aligned. However, when there is a conditional branching instruction, the control of the pipeline becomes unstable and the processing performance is temporarily degraded. In comparison, there is a method to use predicates (hereinafter referred to as a condition flag) in order to decrease conditional branching. The condition flag is capable of modifying instruction words and selecting whether or not to execute a process indicated by the instruction words. This reduces the frequency of using the conditional branching instructions and allows arithmetic operation processing performance to be improved (e.g. see the Patent Reference 2).

Patent Reference 1: Japanese Laid-Open Patent Application No. 2000-47998
Patent Reference 2: Japanese Laid-Open Patent Application No. 10-27102

DISCLOSURE OF INVENTION

Problems that Invention is to Solve

In the conventional technologies, however, since each arithmetic operation element handles different data in a SIMD type arithmetic processing apparatus, operation results obtained from respective arithmetic operation elements are different from each other even though the arithmetic operation elements have the same operational function and use the same instruction words to execute an arithmetic operation.

For instance, in the case where a comparison instruction is executed, since the arithmetic operation is performed by using different data in each arithmetic operation element, the condition flag, which is the operation result, also differs in each arithmetic operation element. Thus, in the case where an arithmetic operation processing with conditions is performed using condition flags, it is easy to perform the conditional execution of the arithmetic operation using the condition flags, each of which is independent for each arithmetic operation element.

In order to commonly use the results of comparison instructions for every arithmetic operation element, however, a common condition flag value must be referred to in all arithmetic operation elements. To this end, a register for storing the logical sum and logical product of the condition flag values of all arithmetic operation elements is also required for each arithmetic operation. This leads to the further need for many more registers thus for the larger size of implementation area. Also, since this is one of the methods for generating a condition flag to be used strictly for a conditional branching instruction and is not capable of reducing the number of conditional branching instructions, a penalty is generated by the issuance of the branching instruction, which in turn leads to the degradation of the arithmetic operation processing performance.

Moreover, in a SIMD type arithmetic processing apparatus, the number of the arithmetic operation elements is determined based on the program with best arithmetic operation processing performance to be requested out of the assumed programs. Thus, in the case where a program that does not require the best processing performance is executed, a SIMD type arithmetic processing apparatus can be configured to use part of the arithmetic operation elements alone and not to use the rest of the arithmetic operation elements.

In the case where the rest of the arithmetic operation elements are not used, however, these units either perform unnecessary arithmetic operations or suspend the entire arithmetic operation so as to contribute to lower power consumption. When a comparison instruction is executed in this case, a comparison instruction is executed using invalid data in the unnecessary arithmetic operation elements or no arithmetic operation is executed. As a result, the resulting condition flag also stores an invalid value. Thus, the arithmetic operation using the condition flag can not be easily performed among arithmetic operation elements, because valid condition flag values are stored only in limited arithmetic operation elements and a process for selecting the valid values alone must be added, in the case where an arithmetic operation is performed among the arithmetic operation elements.

In other words, an SIMD type arithmetic processing apparatus has a problem that when the arithmetic processing apparatus executes conditional branching using the same condition flag as a whole, the high speed effect is not fully obtained unless an arithmetic operation for generating condition flags to be commonly referred to is performed in as few steps as possible by using a condition flag generated for each arithmetic operation element.

In view of the aforementioned problem, the object of the present invention is to provide an arithmetic processing apparatus capable of performing an arithmetic operation for generating a condition flag to be commonly referred to in as few steps as possible by using a condition flag generated for each arithmetic operation element.

Means to Solve the Problems

In order to attain the aforementioned object, the arithmetic processing apparatus according to the present invention is an arithmetic processing apparatus, which processes multiple data in parallel in accordance with single instruction, includes multiple processing elements for performing a common arithmetic operation based on an evaluation result of an instruction stored in an instruction register; a condition flag arithmetic operation unit for performing one of a logical operation and a comparison operation on a condition flag stored in each of the processing elements, transferring the operation result to each of the processing elements, and updating the condition flag based on the operation result.

This allows a condition flag retained in each processing element to be updated with one step and all processing elements to prepare a common condition flag at high speed. In addition, performance degradation caused by penalties can be minimized by lowering the frequency of conditional branching, which has been necessary for the conventional technologies, to reduce the occurrence of penalties triggered by the conditional branching.

Note that the present invention not only is realized as an arithmetic processing apparatus but also can be realized as a method to control the arithmetic processing apparatus (hereinafter referred to as an arithmetic operation processing method), an arithmetic operation processing program for enabling a computer system and the like to emulate the arithmetic operation processing method and recording medium or the like, on which the arithmetic operation processing program is recorded.

Also, the present invention can be realized as a system LSI, into which one or more functions included in an arithmetic processing apparatus (hereinafter referred to as an arithmetic operation processing function) are integrated, an IP core (hereinafter referred to as an arithmetic operation processing core) that establishes the arithmetic operation processing function in a programmable logic devices such as FPGA, CPLD and the like, or as recording medium, on which the arithmetic operation processing core was recorded.

Effects of the Invention

An arithmetic processing apparatus according to the present invention is capable of performing an arithmetic operation on a value of a condition flag register, which is included in each of multiple processing elements, storing the operation results with one step into a condition flag register which is included in each processing element, and thus preparing a common condition flag in all processing elements at high speed. In addition, the arithmetic processing apparatus is capable of minimizing the performance degradation caused by penalties by lowering the frequency of conditional branching, which has been necessary for the conventional technologies, to reduce the occurrence of penalties triggered by the conditional branching.

Furthermore, the arithmetic processing apparatus is capable of updating condition flags, and further decreasing the size of the mounting area until the mounting area becomes smaller in the present invention compared to the case of mounting a condition flag in each processing element by sharing the condition flag arithmetic operation unit that generates a condition flag to be referred to in an execution of the conditional branching.

Furthermore, the arithmetic processing apparatus according to the present invention is capable of easily describe a program by being configured that the condition flag register information to be used is set at a mask register beforehand, because this configuration eliminates the necessity of changing the instruction issuance method for using all condition flag registers even when the number of condition flag registers to be used changes is due to factors related to the program and the like.

NUMERICAL REFERENCES

100, 200, 300, 400 Arithmetic processing apparatus
101, 201, 401 Instruction register
102, 103 Processing element
104, 204, 304, 404 Condition flag arithmetic operation unit
105 Condition flag transferring signal wire
121, 131 Register file
122, 132 ALU arithmetic operation unit
123, 133 Selector
124, 134 Condition flag register
125, 135 Selector
126, 136 Arithmetic operation result update control signal wire
206, 406 Instruction issuance control unit
307 Condition flag mask register
381, 382 Condition flag converter

BEST MODE FOR CARRYING OUT THE INVENTION

First Embodiment

The first embodiment according to the present invention is explained below referring to diagrams.

The arithmetic processing apparatus according to the first embodiment of the present invention includes a condition flag register in each of multiple processing elements, transfers the arithmetic operation results of condition flag values retained in the condition flag register to condition flag registers included in all processing elements, and stores the transferred operation results into the condition flag registers.

This allows all condition flag registers to be updated with one step, all processing elements to prepare a common condition flag at high speed, and the performance degradation caused by the penalties to be minimized by lowering the frequency of conditional branching, which has been necessary for the conventional technologies, to reduce the occurrence of penalties triggered by the conditional branching.

"A condition flag" is a predicate capable of modifying instruction words and selecting whether or not to execute a process indicated by the instruction words. This reduces the frequency of using the conditional branching instructions and allows arithmetic operation processing performance to be improved.

Considering the points described above, the arithmetic processing apparatus according to the first embodiment is explained below.

First, the configuration of the arithmetic processing apparatus according to the first embodiment is explained herein.

Figure 1:
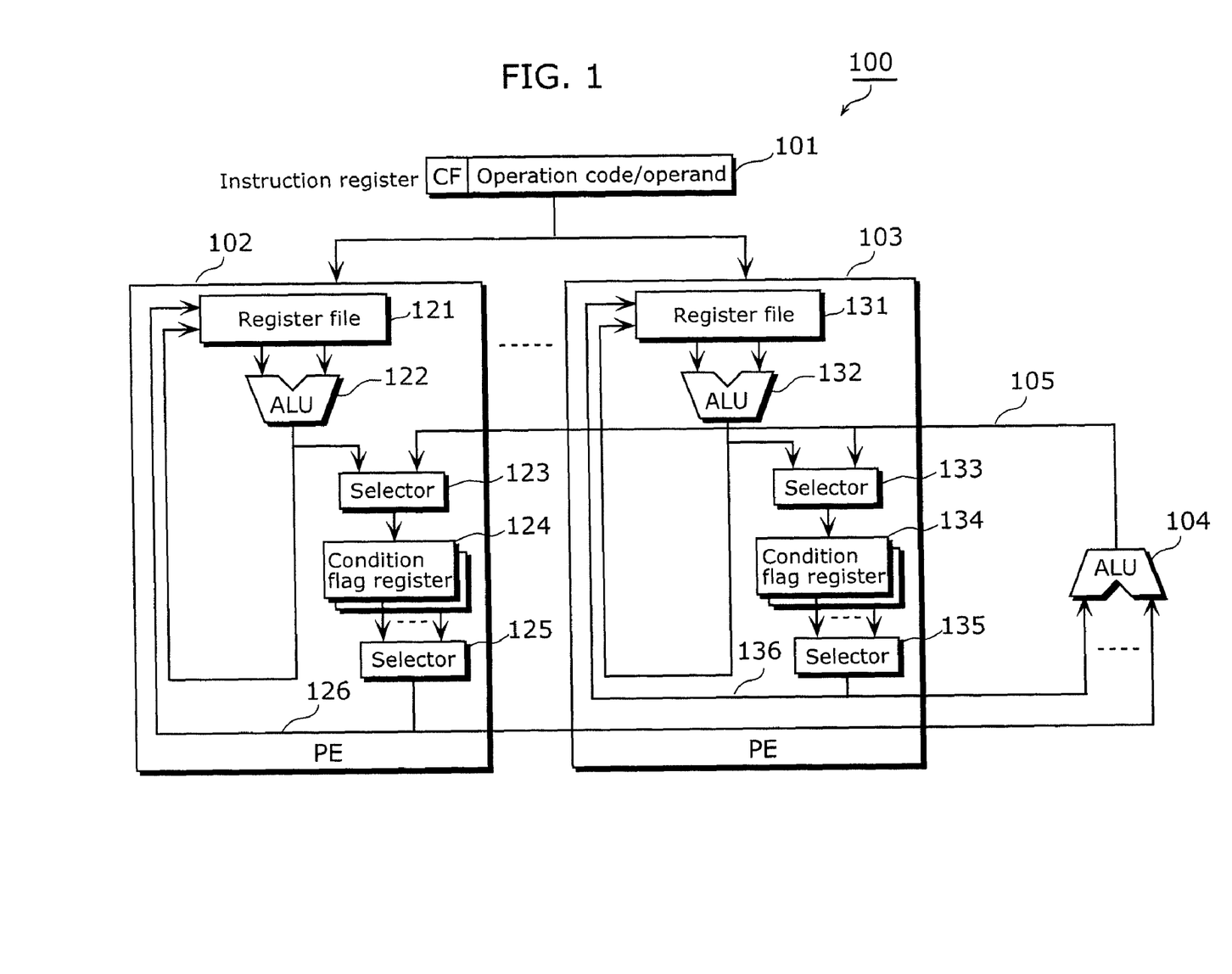
FIG. 1 is a diagram showing a schematic structure of an arithmetic processing apparatus according to a first embodiment.

As described in FIG. 1, the arithmetic processing apparatus 100 is a device providing processing elements (hereinafter referred to as PEs) 102 and 103 with instruction words stored in an instruction register 101, and performing arithmetic operations of multiple data in parallel conforming to single instruction.

As an example, the arithmetic processing apparatus 100 is herein configured to include the instruction register 101, PE 102 and 103, and a condition flag arithmetic operation unit 104.

Moreover, instruction words include a condition flag designating field (hereinafter referred to as CF field), which designates whether or not the conditional execution is conducted and the condition flag numbers to be used, and an operation code/operand field, in which operation codes or operands are designated.

Of all condition flags, condition flags, which are set in the CF field of the instruction register 101, are used by the condition flag arithmetic operation unit 104 to perform either OR operation or AND operation on condition flag values, based on an instruction stored in the instruction register 101. Then, the condition flag arithmetic operation unit 104 transfers the operation results to all PEs via a transfer bus 105. The OR operation alone is explained below as an example, and the explanation regarding the AND operation is omitted.

In addition, since the constituent elements such as an instruction cache for storing programs, a data cache for storing data, and the like, as well as the ALU arithmetic operation processing method are well-know in the conventional technologies, the explanation thereof is omitted.

Note that the number of PEs does not always have to be two. More than two PEs, for example, four PEs may be used.

Note that the condition flag arithmetic operation unit 104 can be configured to perform logical operations except for OR operation and AND operation, for example, Exclusive OR operation. Furthermore, a comparison operation may be performed instead of logical operations. Moreover, in the case where a comparison operation is performed, the comparison operation can be performed on condition flags of multiple bits outputted from each PE. In addition, in the case where the result of a comparison operation which was performed on condition flags of multiple bits outputted from each PE indicates that all condition flags are identical, for example, an operation result indicating that all bits are 1 can be transferred to all PEs. In the case where the result of a comparison operation indicates that all condition flags are not identical, an operation result indicating that all bits are 0 can be transferred to all PEs or no result is transferred.

Next, processing elements of the arithmetic processing apparatus according to the first embodiment are explained. The configuration of the PE 102 is explained herein, and with regard to the PE 103, the explanation of the configuration of the PE 103 is omitted because the PE 103 has the same configuration as that of the PE 102.

In addition, a data supplying unit that supplies data to be arithmetically processed, and a data storing unit that stores data of the operation result in a processing element may be independent units or one unit equipped with the both functions of the data supplying unit and data storing unit. Specifically using a register file as an example, a data recording unit equipped with both functions of a data supplying unit and a data storing unit is explained herein.

The PE 102 includes a register file 121, an ALU arithmetic operation unit 122, a selector 123, a condition flag register 124, and a selector 125.

The ALU arithmetic operation unit 122 performs arithmetic operations using data and immediate values, both of which are stored in the register file 121 based on the instruction register 101.

The selector 123 selects either an operation result transferred from the ALU arithmetic operation unit 122 or an operation result transferred from the condition flag arithmetic operation unit 124 via a condition flag transferring signal wire 105, and transfers the selected operation result to the condition flag register 124.

The condition flag register 124 retains the operation result transferred from the selector 123.

In the case where there are multiple condition flag registers 124, the selector 125 selects a condition flag register 124 out of the multiple condition flag registers 124 for transferring a condition flag which is retained in the selected condition flag register 124 based on the value of the CF field of the instruction register 101.

A register update control signal wire 126 is a control signal wire for allowing one of the register file 121 and the condition flag register 124 to selectively store operation results of the ALU arithmetic operation unit 122 based on the content of the condition flag and the like.

Note that, in the register file 121, an area for storing multiple data is established so that an arbitrary data value can be used.

For example, in the case where four data areas are established, these areas are generally numbered R0, R1, R2 and R3 or the like, so that they are identified.

Along with this, the condition flag registers 124 are generally numbered C0, C1, C2 and C3, or the like.

For example, when vector data is stored in register files R1 to R4, the condition flag register 124 may be configured that two condition flags are respectively corresponded to two data with 8-bit length, and the C0 retains these condition flags. In this case, the arithmetic processing apparatus 100 may be also configured that the C1, C2 and C3 retain condition flags corresponding to the data with 16-bit length, two condition flags each of which corresponds to each of two data with 16-bit length, and condition flags corresponding to the data with 32-bit length, respectively.

Note that the number of the condition flag registers 124 does not always have to be two. More than two condition flag registers 124, for example, four registers may be used, so that these condition flag registers 124 can be identified more accurately.

Next, an instruction string to be provided to the arithmetic processing apparatus in the first embodiment is explained below.

Figure 2A:
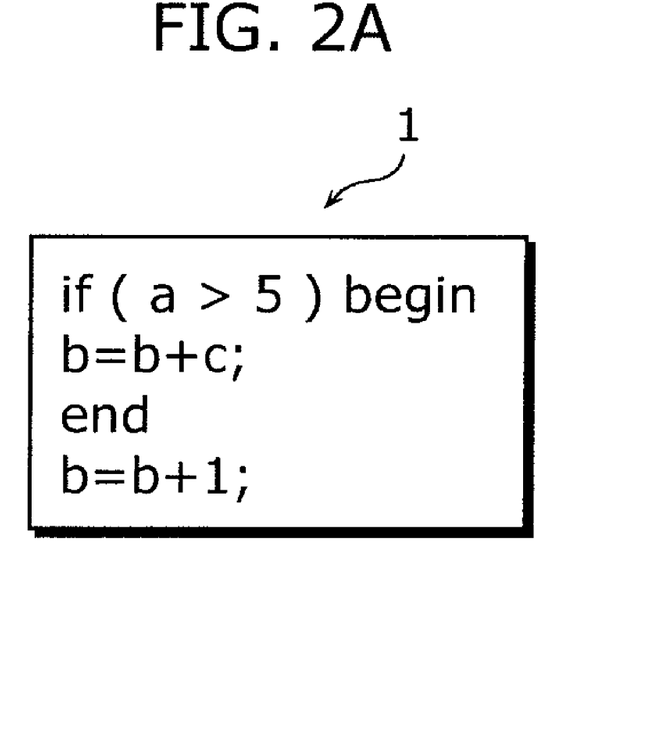
FIG. 2A is a diagram showing an example of an instruction string provided for an arithmetic processing apparatus according to the first embodiment.
Figure 2B:
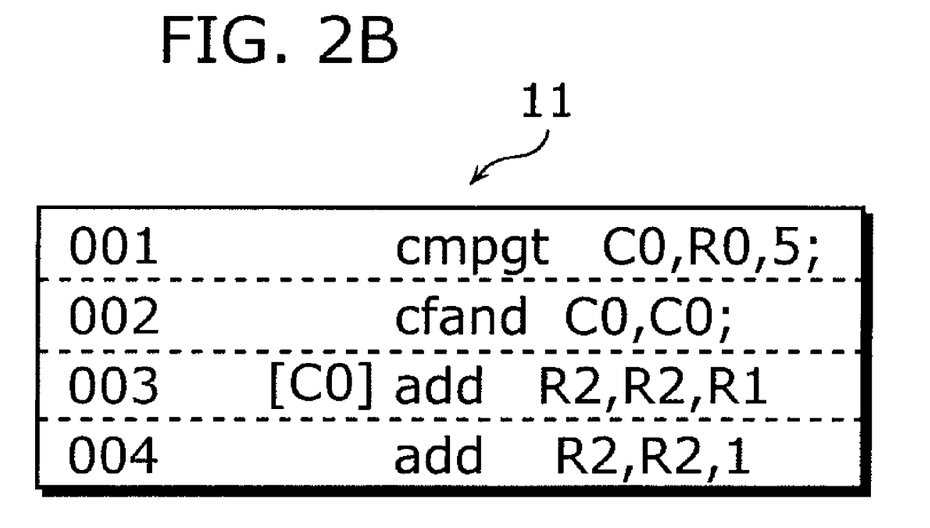
FIG. 2B is a diagram showing an example of an instruction string provided for an arithmetic processing apparatus according to the first embodiment.

As described in FIG. 2A and FIG. 2B, an instruction string 11 is herein generated as an example by compiling a source code 1.

The instruction string 11 includes a first instruction (001), a second instruction (002), a third instruction (003) and a fourth instruction (004).

The first instruction (001) is a comparison instruction (cmpgt).

The second instruction (002) is an instruction for AND operation between values of the condition flag register of respective PEs (cfand).

The third instruction (003) is an addition instruction of the conditional execution mode ([C0] add).

The fourth instruction (004) is an addition instruction of normal execution mode (add).

In addition to the comparison instruction described above, the arithmetic processing apparatus 100 can be similarly configured to execute an instruction for performing AND operation between values of the condition flag register of respective PEs under an instruction for generating a condition flag, such as a movement instruction, an instruction for performing a logical operation and the like.

Next, the operation of the arithmetic processing apparatus according to the first embodiment is explained below. As an example, the case of executing the instruction string 11 generated from a source code 1, which is described in FIG. 2A and FIG. 2B, explained herein.

The arithmetic processing apparatus 100 executes the first instruction (001), and stores "1", which indicates "TRUE", into the C0 of a condition flag register in each PE set in a CF field of the first instruction in the case where the result of comparing the value of the R0 in the register file 121 with an immediate value "5" indicates that the value of the R0 is greater than the immediate value "5". On the other hand, in the case where the value of the R0 is an immediate value "5" or under, the arithmetic processing apparatus 100 stores "0", which indicates "FALSE", into the C0 of a condition flag register in each PE. In this case, the selector 123 is set to select values transferred from the ALU arithmetic operation unit 122.

Next, the arithmetic processing apparatus 100 executes the second instruction (002), and performs AND operation between values of the condition flag register C0 of respective PEs at the condition flag arithmetic operation unit 104. The operation results are stored into the C0 of a condition flag of each PE via the condition flag transferring signal wire 105. In this case, the condition flag register to be used is numbered in an operand of the instruction register 101, and the selector 123 is set to select values transferred via the condition transferring signal wire 105.

Next, the arithmetic processing apparatus 100 executes the third instruction (003); reads values of the R1 and R2 out of the register file 121 in the case where the arithmetic processing apparatus 100 is configured that the conditional execution is applied to the CF field of instruction words and that the condition flag register is numbered C0; adds the read-out value of the R1 to the read-out value of the R2 at the ALU arithmetic operation unit 122; and stores the result into the R2 of the register file 121. In this case, if the value of the C0 in the condition flag register 124 is TRUE, "1", Active signals are provided to the register file 121 via an arithmetic operation result update control signal wire 126, so that the addition operation result is stored in the register file 121. On the other hand, if the value of the C0 in the condition flag register 124 is FALSE, "0", Negative signals are provided to the register file 121, so that the addition operation result is not stored in the register file 121.

Next, the arithmetic processing apparatus 100 executes the fourth instruction (004), reads a value of the R2 out of the register file 121, adds the read-out value to an immediate value "1" at the ALU arithmetic operation unit 122, and stores the result into the R2 of the register file 121.

As explained above, the arithmetic processing apparatus 100 according to the first embodiment is capable of completing an operation and an updating process to a value of a condition flag register in each PE in the second instruction (002) in one step, requiring no unnecessary data transfer between PEs, and decreasing the number of the cycles of completing the execution of conditional branching because a penalty from conditional branching rarely occurs.

Furthermore, the arithmetic processing apparatus 100 according to the first embodiment is capable of updating all condition flag registers in one step, and preparing a common condition flag in all processing elements at a high speed. As described in FIG. 3B, the arithmetic processing apparatus 100 according to the first embodiment is further capable of minimizing the performance degradation caused by penalties by lowering the frequency of instructions for conditional branching (002), which has been necessary for the conventional technologies, to reduce the occurrence of penalties triggered by the conditional branching.

Figure 3A:
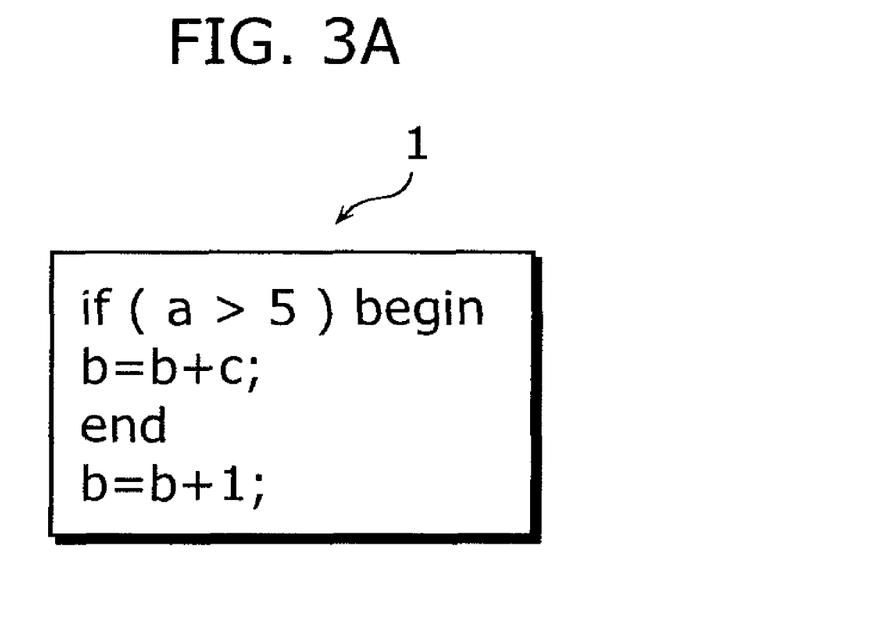
FIG. 3A is a diagram showing an example of an instruction string provided for an arithmetic processing apparatus in the conventional technologies.
Figure 3B:
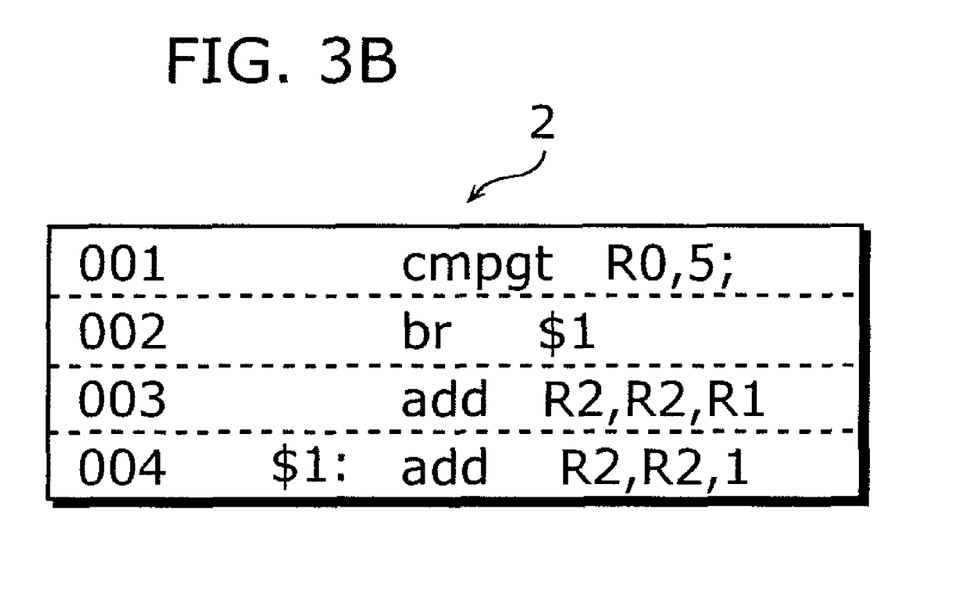
FIG. 3B is a diagram showing an example of an instruction string provided for an arithmetic processing apparatus in the conventional technologies.

An instruction string 2 herein described in FIG. 3B is an instruction string provided for conventional-type arithmetic processing apparatuses, the instruction string being generated by compiling a source code indicated in FIG. 3A.

Second Embodiment

Next, the second embodiment according to the present invention is explained below referring to diagrams.

The arithmetic processing apparatus according to the second embodiment of the present invention includes an instruction issuance control unit capable of performing conditional branching based on the operation results transferred from a condition flag arithmetic unit.

Considering the points described above, the arithmetic processing apparatus according to the second embodiment is explained below. Note that same reference numbers are attached to constituent elements identical to the constituent elements described in the first embodiment, and the explanation of these constituent elements shall be omitted.

First, the configuration of the arithmetic processing apparatus according to the second embodiment is explained herein.

Figure 4:
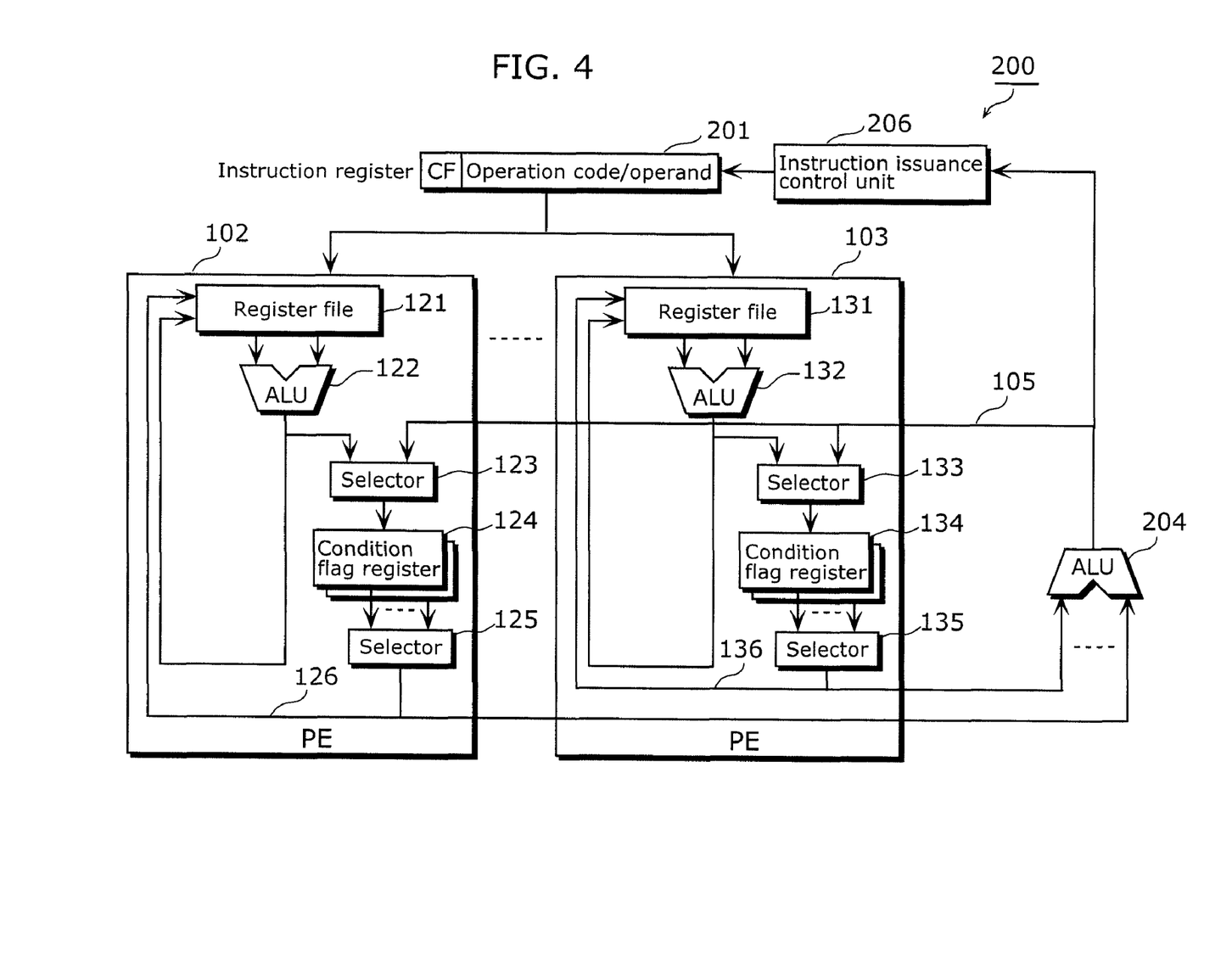
FIG. 4 is a diagram showing a schematic structure of an arithmetic processing apparatus according to a second embodiment.

As described in FIG. 4, the arithmetic processing apparatus 200 is different from the arithmetic processing apparatus 100 in the following requirements:

(1) The arithmetic processing apparatus 200 includes an instruction register 201 instead of the instruction register 101. The instruction register 201 retains instructions transferred from an instruction issuance control unit 206.

(2) The arithmetic processing apparatus 200 includes a condition flag arithmetic operation unit 204 instead of the condition flag arithmetic operation unit 104. The condition flag arithmetic operation unit 204 transfers the operation results also to the instruction issuance control unit 206.

(3) The arithmetic processing apparatus 200 newly includes an instruction issuance control unit 206. The instruction issuance control unit 206 controls the issuance of instructions including instructions for conditional branching. Based on the operation result transferred from the condition flag arithmetic operation unit 204, the instruction issuance control unit 206 issues instructions and transfers the issued instructions to the instruction register 201.

Next, instruction strings provided for the arithmetic processing apparatus according to the second embodiment are explained below.

Figure 5A:
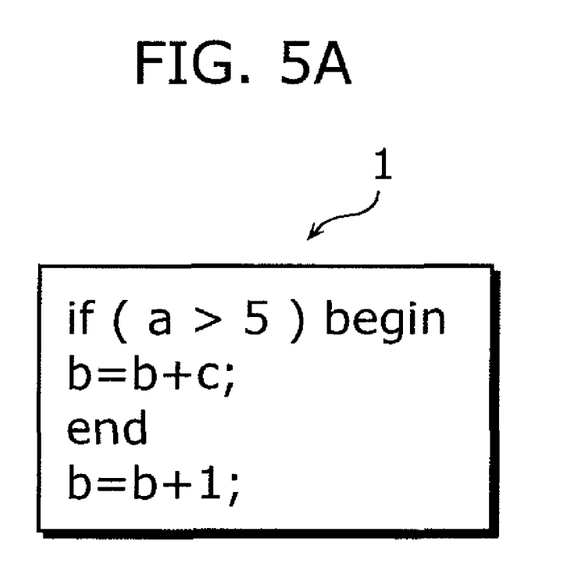
FIG. 5A is a diagram showing an example of an instruction string provided for an arithmetic processing apparatus according to the second embodiment.
Figure 5B:
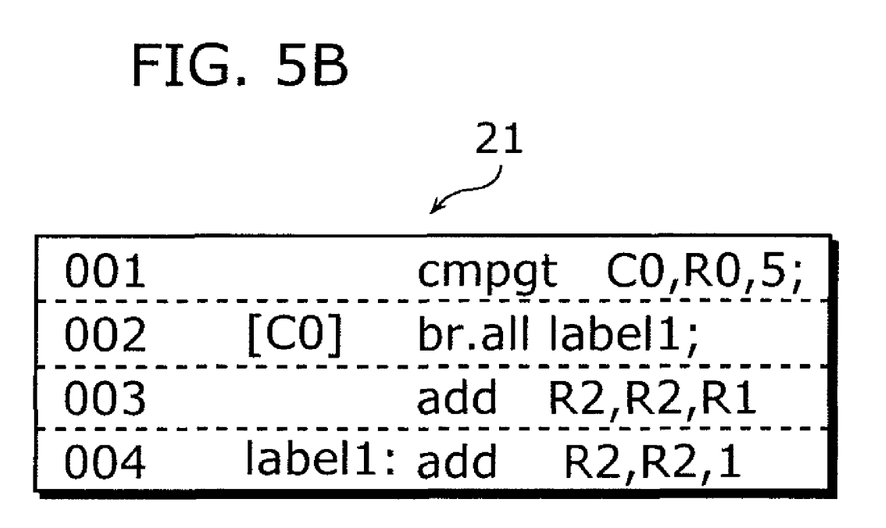
FIG. 5B is a diagram showing an example of an instruction string provided for an arithmetic processing apparatus according to the second embodiment.

As described in FIG. 5A and FIG. 5B, an instruction string 21 is herein generated as an example by compiling a source code 1.

The instruction string 21 includes a first instruction (001), a second instruction (002), a third instruction (003), and a fourth instruction (004).

The first instruction (001) is a comparison instruction (cmpgt).

The second instruction (002) is an instruction for AND operation between values of the condition flag register of respective PEs ([C0] br.all).

The third instruction (003) is an addition instruction in the case where branch processing is not performed (add).

The fourth instruction (004) is an addition instruction in the case where branch processing is performed (label 1: add).

Here, "br.all" indicates that a branching type instruction "br" is executed only when all condition flags of PEs are "1".

Note that, in addition to this, the arithmetic processing apparatus 200 can be configured to execute a branching type instruction, such as "jump", "loop" and the like, only when condition flags of PEs are all "1".

Next, the operation of the arithmetic processing apparatus according to the second embodiment is explained below. As an example, the case of executing the instruction string 21 generated from a source code 1, which is described in FIG. 5A and FIG. 5B, is explained herein.

The arithmetic processing apparatus 200 executes the first instruction (001) and stores "1", which indicates "TRUE", into the C0 of a condition flag register in each PE set in a CF field of the first instruction, in the case where the result of comparing the value of the R0 in the register file 121 with an immediate value "5" indicates that the a value of the R0 is greater than an immediate value "5". On the other hand, in the case where the value of the R0 is an immediate value "5" or under, the arithmetic processing apparatus 200 stores "0", which indicates "FALSE", into the C0 of a condition flag register in each PE. In this case, the selector 123 is set to select values transferred from an ALU arithmetic operation unit 122.

Next, the arithmetic processing apparatus 200 executes the second instruction (002), and performs AND operation between values of the condition flag register of respective PEs by the condition flag arithmetic operation unit 204. The operation results are stored into the C0 of a condition flag register of each PE via the condition flag transferring signal wire 105.

Furthermore, the arithmetic processing apparatus 200 transfers the operation results to the instruction issuance control unit 206 via the condition flag transferring signal wire 105. Further, in the case where a condition flag value, which was transferred to the instruction issuance control unit 206 via the condition flag transferring signal wire 105, is TRUE "1", the arithmetic processing apparatus 200 performs branching processing, transfers the fourth instruction (004) from the instruction issuance control unit 206 to the instruction register 201, and executes the fourth instruction (004). On the other hand, in the case where a condition flag value, which was transferred to the instruction issuance control unit 206 via the condition flag transferring signal wire 105, is FALSE "0", the arithmetic processing apparatus 200 does not perform branching processing, transfers the third instruction (003) from the instruction issuance control unit 206 to the instruction register 201, and executes the third instruction (003).

Next, the arithmetic processing apparatus 200 executes the third instruction (003), reads values of the R1 and R2 out of a register file in each PE, adds the read-out value of the R1 to the read-out value of the R2 by the ALU arithmetic operation unit 122, and stores the result into the R2 of the register file 121.

Next, the arithmetic processing apparatus 200 executes the fourth instruction (004), reads a value of the R2 out of a register file in each PE, adds the read-out value of the R2 to an immediate value "1" by the ALU arithmetic operation unit 122, and stores the result into the R2 of the register file 121.

As explained above, the arithmetic processing apparatus 200 according to the second embodiment is capable of decreasing the size of the mounting area by commonly using the condition flag arithmetic operation unit 204, when performing the conditional branching.

The arithmetic processing apparatus 200 is also configured with an instruction (br.any) and the like, which are used in the condition flag arithmetic operation unit 204 to perform OR operation in addition to AND operation.

Here, "br.any" indicates that a branching type instruction "br" is executed if any of the condition flags in all PEs is "1".

Note that, in addition to this, the arithmetic processing apparatus 200 can be configured to execute a branching type instruction, such as "jump", "loop" or the like, if any of the condition flags of all PEs is "1".

Third Embodiment

Next, the third embodiment according to the present invention is explained below referring to diagrams.

The arithmetic processing apparatus according to the third embodiment of the present invention includes a condition flag mask register, which has the same number of bits as the number of multiple processing elements and each bit corresponding one-to-one to each processing element; and a condition flag converter, which converts (i) a value of a condition flag from a processing element corresponding to the bit value of the condition flag mask register into a first logical value in the case where OR operation is performed at the condition flag mask register and (ii) a value of a condition flag from the processing element corresponding to the bit value of the condition flag mask register into a second logical value in the case where AND operation is performed by the condition flag mask register.

Considering the points described above, the arithmetic processing apparatus according to the third embodiment is explained below. Note that reference numbers are attached to constituent elements identical to the constituent elements described in the first embodiment, and the explanation of these constituent elements shall be omitted.

First, the configuration of the arithmetic processing apparatus according to the third embodiment is explained herein.

Figure 6:
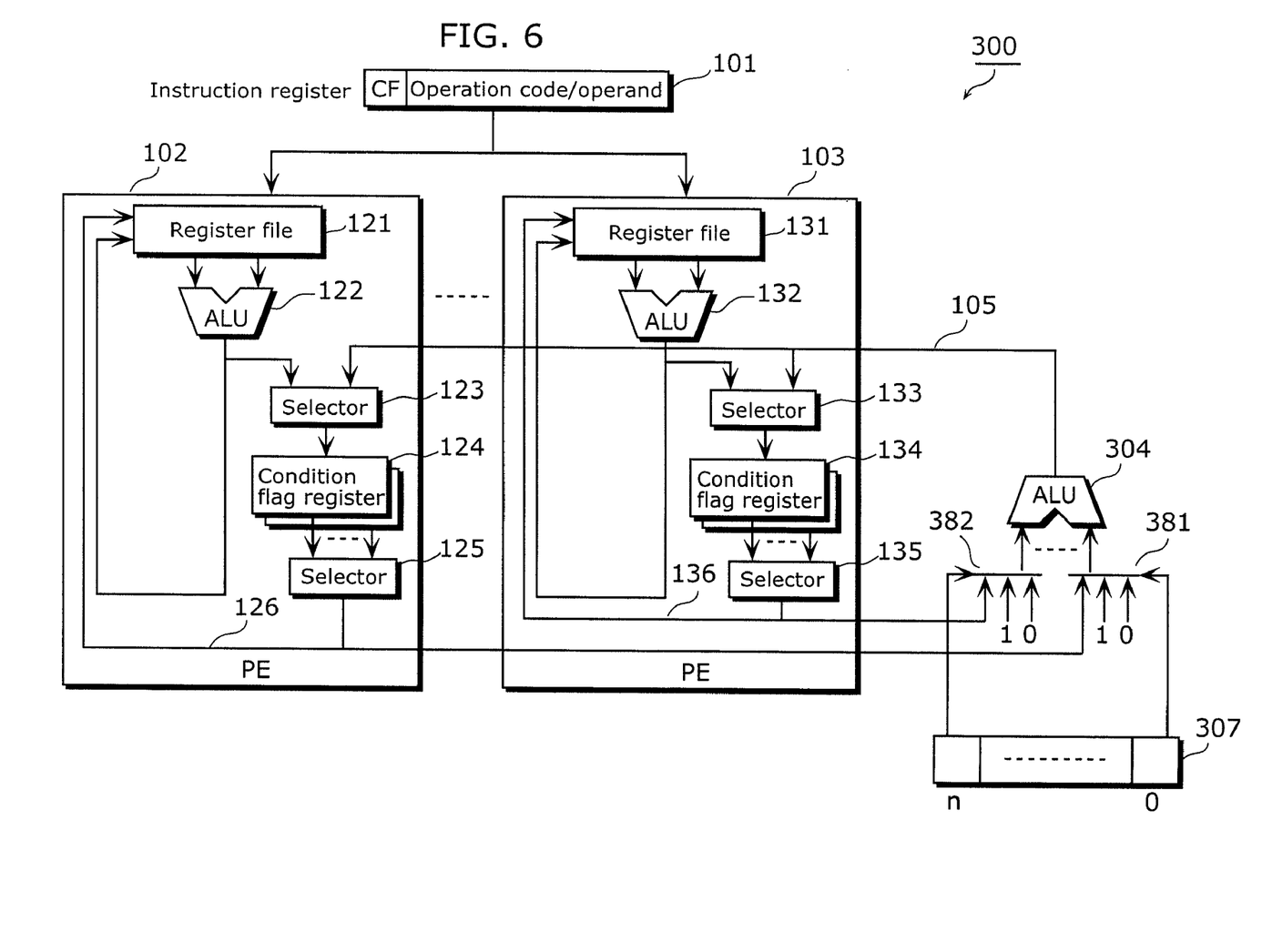
FIG. 6 is a diagram showing a schematic structure of an arithmetic processing apparatus according to a third embodiment.

As described in FIG. 6, the arithmetic processing apparatus 300 is different from the arithmetic processing apparatus 100 in the requirement described below.

(1) The arithmetic processing apparatus 300 newly includes a condition flag mask register 307, and condition flag converters 381 and 382. The condition flag mask register 307 retains set values. The condition flag converters 381 and 382 convert an output value of a selector 125 into either "0" or "1".

Next, the operation of the arithmetic processing apparatus according to the third embodiment is explained below. As an example, the case of executing the instruction string 11 generated from a source code 1, which is described in FIG. 2A and FIG. 2B, is explained herein.

Note that the arithmetic processing apparatus 300 is configured beforehand that a bit corresponding to a PE 102 is set to "0" and a bit corresponding to a PE 103 is set to "1" at the condition flag mask register 307, and a value "10" is stored in the condition flag mask register 307. In addition, the arithmetic processing apparatus 300 is configured to use a PE 102 alone and not to use a PE 103 for an instruction string 11.

The arithmetic processing apparatus 300 executes the first instruction (001), and stores "1", which indicates "TRUE", into the C0 of a condition flag register in each PE set in a CF field of the first instruction, in the case where the result of comparing the value of the R0 in the register file 121 with an immediate value "5" indicates that the a value of the R0 is greater than an immediate value "5". On the other hand, in the case where the value of the R0 is an immediate value "5" or under, the arithmetic processing apparatus 300 stores "0", which indicates "FALSE", into the C0 of a condition flag register in each PE. In this case, the selector 123 is set to select values transferred from an ALU arithmetic operation unit 122.

Next, the arithmetic processing apparatus 300 executes the second instruction (002), converts each condition flag by each condition flag converter based on the condition flag mask register 307, and performs AND operation between the converted values of the condition flag register in respective PEs by the condition flag arithmetic operation unit 304. The operation result is stored in the C0 of a condition flag register of each PE via a condition flag transferring signal wire 105. In this case, the condition flag register to be used is numbered in an operand of the instruction register 101, and the selector 123 is set to select values transferred via the condition transferring signal wire 105.

Since a bit corresponding to the PE 102 is herein set to "0" at the condition flag mask register 307, the value of the condition flag register 124 in the PE 102 is not converted by the condition flag converter 381. Furthermore, since the arithmetic processing apparatus 300 is configured that an instruction to be executed is AND operation and a bit corresponding to the PE 103 is "1", the condition flag value of the PE 103 is converted into "1" by the condition flag converter 382.

Next, the arithmetic processing apparatus 300 executes the third instruction (003); reads values of the R1 and R2 out of the register file 121 in the case where the arithmetic processing apparatus 300 is configured that the conditional execution is applied to a CF field of instruction words and that the condition flag register is numbered C0; adds the read-out value of the R1 to the read-out value of the R2 by the ALU arithmetic operation unit 122; and stores the result into the R2 of the register file 121. In this case, if the value of the C0 in the condition flag register 124 is TRUE, "1", Active signals are provided to the register file 121 via an arithmetic operation result update control signal wire 126, so that the addition operation result is stored in the register file 121. On the other hand, if the value of the C0 in the condition flag register 124 is FALSE, "0", Negative signals are provided to the register file 121, so that the addition operation result is not stored in the register file 121.

Next, the arithmetic processing apparatus 300 executes the fourth instruction (add), reads a value of the R2 out of the register file 121, adds the read-out value to an immediate value "1" by the ALU arithmetic operation unit 122, and stores the result into the R2 of the register file 121.

As explained above, the arithmetic processing apparatus 300 according to the third embodiment is capable of executing the second instruction (002), and performing AND operation using only valid condition flag values by being configured that the condition flag converter 382 converts the value of the condition flag register 134 of the PE 103, which is invalid data, into a flag value "1", which does not affect the result of the AND operation before the AND operation is performed on the value of a condition flag register of each PE.

In addition, since the arithmetic processing apparatus 300 is configured that, just as long as the value of the condition flag mask register 307 is set in advance, it is unnecessary to change the instruction issuance method between the cases of the condition flag value of the PE 103 being valid and invalid, programs can be easily created.

Fourth Embodiment

Next, the fourth embodiment according to the present invention is explained below referring to diagrams.

The arithmetic processing apparatus in the fourth embodiment according to the present invention includes an instruction issuance control unit capable of executing conditional branching based on the arithmetic operations transferred from a condition flag arithmetic operation unit.

Considering the points described above, the arithmetic processing apparatus according to the fourth embodiment is explained below. Note that reference numbers are attached to constituent elements identical to the constituent elements described in the third embodiment, and the explanation of these constituent elements shall be omitted.

First, the configuration of the arithmetic processing apparatus according to the fourth embodiment is explained herein.

Figure 7:
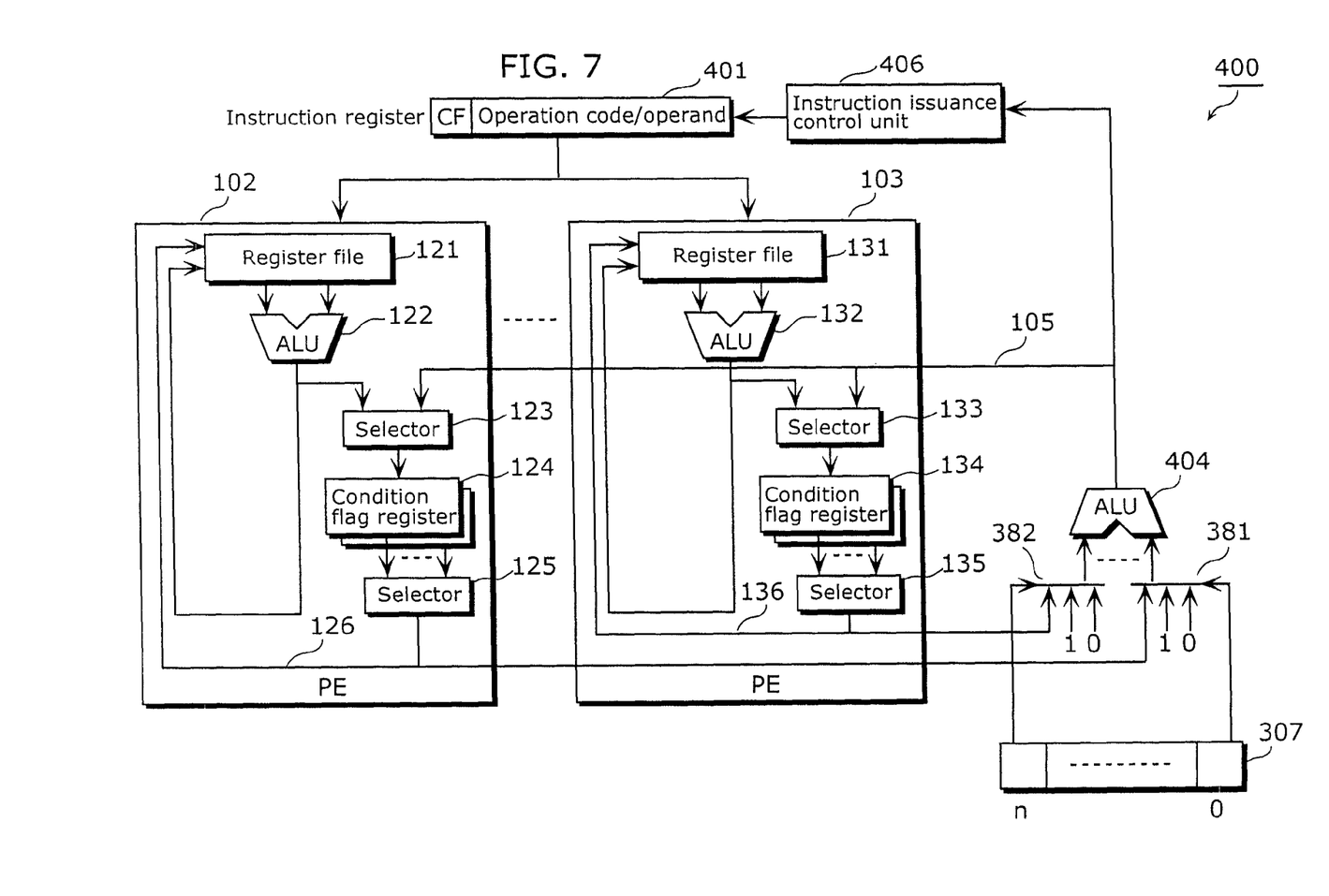
FIG. 7 is a diagram showing a schematic structure of an arithmetic processing apparatus according to a fourth embodiment.

As described in FIG. 7, the arithmetic processing apparatus 400 is different from the arithmetic processing apparatus 300 in the following requirements:

(1) The arithmetic processing apparatus 400 includes an instruction register 401 instead of the instruction register 101. The instruction register 401 retains instructions transferred from an instruction issuance control unit 406.

(2) The arithmetic processing apparatus 400 includes a condition flag arithmetic operation unit 404 instead of the condition flag arithmetic operation unit 304. The condition flag arithmetic operation unit 404 transfers the operation results also to the instruction issuance control unit 406.

(3) The arithmetic processing apparatus 400 newly includes an instruction issuance control unit 406. The instruction issuance control unit 406 controls the issuance of instructions including branching type instructions with conditions. Based on the operation result transferred from the condition flag arithmetic operation unit 404, the instruction issuance control unit 406 issues instructions and transfers the issued instructions to the instruction register 401.

Note that detailed configuration of the instruction issuance control unit 406 is omitted because the instruction issuance control unit 406 is well-known in the conventional technologies.

Next, the operation of the arithmetic processing apparatus according to the fourth embodiment is explained below. As an example, the case of executing the instruction string 21 generated from a source code 1, which is described in FIG. 5A and FIG. 5B, is explained herein.

Note that the arithmetic processing apparatus 400 is configured that a bit corresponding to a PE 102 is set to "0" and a bit corresponding to a PE 103 is set to "1" at the condition flag mask register 307 beforehand, and a value "10" is stored into the condition flag mask register 307. In addition, the arithmetic processing apparatus 400 is configured to use a PE 102 alone and not to use a PE 103 for an instruction string 21.

The arithmetic processing apparatus 400 executes the first instruction (001), and stores "1", which indicates "TRUE", into the C0 of a condition flag register in each PE set in a CF field of the first instruction, in the case where the result of comparing the value of the R0 in the register file 121 with an immediate value "5" indicates that the a value of the R0 is greater than an immediate value "5". On the other hand, in the case where the value of the R0 is an immediate value "5" or under, the arithmetic processing apparatus 400 stores "0", which indicates "FALSE", into the C0 of a condition flag register in each PE. In this case, the selector 123 is set to select values transferred from an ALU arithmetic operation unit 122.

Next, the arithmetic processing apparatus 400 executes the second instruction (002), converts the instruction result by each condition flag converter based on the condition flag mask register 307, and performs AND operation between the converted values of condition flag register in respective PEs by the condition flag arithmetic operation unit 404. The operation result is stored in the C0 of a condition flag register of each PE via a condition flag transferring signal wire 105. In this case, the condition flag register to be used is numbered in an operand of the instruction register 101, and the selector 123 is set to select values transferred via the condition transferring signal wire 105.

Since a bit corresponding to the PE 102 is herein set to "0" at the condition flag mask register 307, the value of the condition flag register 124 in the PE 102 is not converted by the condition flag converter 381. Furthermore, since the arithmetic processing apparatus 400 is configured that an instruction to be executed is AND operation and a bit corresponding to the PE 103 is "1", the value of the condition flag register 134 in the PE 103 is converted into "1" by the condition flag converter 382.

Furthermore, the arithmetic processing apparatus 400 transfers the operation results to the instruction issuance control unit 406 via the condition flag transferring signal wire 105. Further, in the case where a condition flag value, which was transferred to the instruction issuance control unit 406 via the condition flag transferring signal wire 105, is "1", the arithmetic processing apparatus 400 performs branching processing, transfers the fourth instruction (004) from the instruction issuance control unit 406 to the instruction register 101, and executes the fourth instruction (004). On the other hand, in the case where a condition flag value, which was transferred to the instruction issuance control unit 406 via the condition flag transferring signal wire 105, is "0", the arithmetic processing apparatus 400 does not perform branching processing, transfers the third instruction (003) from the instruction issuance control unit 406 to the instruction register 101, and executes the third instruction (003).

Next, the arithmetic processing apparatus 400 executes the third instruction (003), reads values of the R1 and R2 out of a register file in each PE, adds the read-out value of the R1 to the read-out value of the R2 by the ALU arithmetic operation unit 122, and stores the result into the R2 of the register file 121.

Next, the arithmetic processing apparatus 400 executes the fourth instruction (004), reads a value of the R2 out of a register file in each PE, adds the read-out value of the R2 to the immediate value "1" by the ALU arithmetic operation unit 122, and stores the result into the R2 of the register file 121.

As explained above, the arithmetic processing apparatus 400 according to the fourth embodiment is capable of executing the second instruction (002), and performing AND operation using only valid condition flag values by being configured that the condition flag converter 382 converts the invalid data of the value of the condition flag register 134 of the PE 103 into a flag value "1", the value not affecting the result of the AND operation, before the AND operation is performed between values of a condition flag register of respective PEs.

In addition, since the arithmetic processing apparatus 400 is configured that, just as long as the value of the condition flag mask register 307 is set in advance, it is unnecessary to change the instruction issuance method between the cases of the condition flag value of the PE 103 being valid and invalid, it becomes possible to perform conditional branching at a high speed.

(Variations)

Note that a processing element may include another special arithmetic operation unit such as an extended arithmetic operation unit (XU arithmetic operation unit) and the like for performing a pixel operation and a predetermined processing, replacing with an ALU arithmetic operation unit.

Note that an instruction issuance control unit may also include a flag used for branching type instruction and issue an instruction in accordance with the flag.

In addition, an arithmetic processing apparatus may be realized as a full-custom LSI (Large Scale Integration), a semi-custom LSI including an ASIC (Application Specific Integrated Circuit), a programmable logic device including a FPGA (Field Programmable Gate Array) and a CPLD (Complex Programmable Logic Device), or a dynamic reconfigurable device which is capable of dynamically rewriting the circuit configuration.

In addition, design data for configuring the LSIs stated above to have one or more functions of an arithmetic processing apparatus may be a program described in a hardware description language such as VHDL (Very high speed integrated circuit Hardware Description Language), Verilog-HDL, System C and the like (hereinafter referred to as an HDL program). Moreover, it may be a net list on a gate level, which is obtained by performing logic synthesis on an HDL program. Further, it may be macro-cell information, in which the arrangement information, process condition and the like is added to a net list on a gate level. Furthermore, it may be the mask data, in which the size, timing and the like are determined.

The design data may also be recorded on recording medium such as an optical recording medium (e.g. a CD-ROM), a magnetic recording medium (e.g. a hard disc), a magneto-optical recording medium (e.g. an MO) a semiconductor memory (e.g. a RAM) and the like, which can be read via the Internet, so as to be is read into a hardware system such as a computer system, an embedded system and the like. In addition, the design data, which has been read by another hardware system via a recording medium, may be downloaded into a programmable logic device via a download cable.

Moreover, the design data may be retained in a hardware system on a transmission line so as to be obtained by another hardware system via a transmission line such as the network line and the like. Furthermore, design data, which has been obtained from a hardware system into another hardware system via a transmission line, may be downloaded into a programmable logic device via a download cable.

In addition, the arranged and wired design data, on which logic synthesis was performed, may be recorded on a serial ROM so as to be transferred to FPGA when the power is on. Also, the design data recorded on a serial ROM may be directly downloaded into FPGA when the power is on.

In addition, the wired and arranged design data, on which logic synthesis was performed, may be generated by the micro processing apparatus, when the power is on, and downloaded into FPGA.

INDUSTRIAL APPLICABILITY

The present invention can be used as a SIMD type arithmetic processing apparatus or the like, which includes a condition flag register, an apparatus for generating and selecting a condition execution flag and the like, and is capable of performing the same processing efficiently performing arithmetic operations of the same process on multiple data at high speed, specifically, as a SIMD type arithmetic processing apparatus or the like that is useful in the case where the image processing is performed on a still image or a moving image.

The invention claimed is:

1. An arithmetic processing apparatus which processes multiple data in parallel in accordance with a single instruction, said arithmetic processing apparatus comprising:

a plurality of processing elements operable to perform a common arithmetic operation based on an evaluation result of an instruction stored in an instruction register; and a condition flag arithmetic operator operable to selectively perform one of a logical operation and a comparison operation on a condition flag stored in each of said plurality of processing elements, and to transfer an operation result to each of said plurality of processing elements, wherein each of said plurality of processing elements updates the condition flag based on the operation result, the operation result being common to said plurality of processing elements, a condition flag mask register having a bit width including a same number of bits as a number of said plurality of processing elements, each bit corresponding one-to-one to each of said plurality of processing elements; and a condition flag converter operable to convert a value of the condition flag from a processing element, the value corresponding to a bit value of said condition flag mask register, into a first logical value, when the logical operation performed by said condition flag arithmetic operator is an OR operation, and to convert a value of the condition flag from said processing element, the value corresponding to a bit value of said condition flag mask register, into a second logical value, when the logical operation performed by said condition flag arithmetic operator is an AND operation.

2. The arithmetic processing apparatus according to claim 1, further comprising:

an instruction issuance controller operable to execute a conditional branch based on the operation result transferred from said condition flag arithmetic operator.

3. An arithmetic processing apparatus which processes multiple data in parallel in accordance with a single instruction, said arithmetic processing apparatus comprising:

a plurality of processing elements operable to perform a common arithmetic operation based on an evaluation result of an instruction stored in an instruction register; and a condition flag arithmetic operator operable to selectively perform one of a logical operation and a comparison operation on a condition flag stored in each of said plurality of processing elements, and to transfer an operation result to each of said plurality of processing elements, wherein each of said plurality of processing elements updates the condition flag based on the operation result, the operation result being common to said plurality of processing elements, and wherein each of said plurality of processing elements includes:

at least one condition flag register, each of which retains the condition flag;

a data supply operable to supply data;

a data storage operable to store an operation result of the data;

an arithmetic operator operable to perform a predetermined arithmetic operation on the data supplied by said data supply, and to transfer the operation result to said data storage and said at least one condition flag register;

a first selector which selects one of the operation results transferred from said condition flag arithmetic operator and the arithmetic operator, and transfers the selected operation result to said at least one condition flag register; and a second selector which selects one of register values from said at least one condition flag register, and transfers the selected register value to said data storage and said condition flag arithmetic operator.

4. An arithmetic processing apparatus which processes multiple data in parallel in accordance with a single instruction, said arithmetic processing apparatus comprising:

a plurality of processing elements operable to perform a common arithmetic operation based on an evaluation result of an instruction stored in an instruction register; and a condition flag arithmetic operator operable to selectively perform one of a logical operation and a comparison operation on a condition flag stored in each of said plurality of processing elements, and to transfer an operation result to each of said plurality of processing elements, wherein each of said plurality of processing elements updates the condition flag based on the operation result, the operation result being common to said plurality of processing elements, and wherein each of said plurality of processing elements includes:

at least one condition flag register, each of which retains the condition flag;

a data recorder operable to supply data and to store an operation result of the data;

an arithmetic operator operable to perform a predetermined arithmetic operation on the data supplied by said data recorder, and to transfer the operation result to said data recorder and to said at least one condition flag register;

a first selector which selects one of the operation results transferred from said condition flag arithmetic operator and the arithmetic operator, and transfers the selected operation result to said at least one condition flag register; and a second selector which selects one of register values from said at least one condition flag register, and transfers the selected register value to said data recorder and said condition flag arithmetic operator.

5. An arithmetic operation processing method used in an apparatus which includes a plurality of processing elements, a condition flag arithmetic operator to process multiple data in parallel in accordance with a single instruction, and a condition flag mask register having a bit width including a same number of bits as a number of the plurality of processing elements, each bit corresponding one-to-one to each of the plurality of processing elements, the arithmetic operation processing method comprising:

performing an arithmetic operation in which the plurality of processing elements perform a common arithmetic operation based on an evaluation result of an instruction stored in an instruction register, and performing a condition flag arithmetic operation in which the condition flag arithmetic operator selectively performs one of a logical operation and a comparison operation on the condition flag retained in each processing element, and transfers the operation result to each of the plurality of processing elements, wherein each of the plurality of processing elements updates the condition flag based on the operation result, the operation result is common to the plurality of processing elements, and converting a value of the condition flag from a processing element, the value corresponding to a bit value of the condition flag mask register, into a first logical value, when the logical operation performed by the condition flag arithmetic operator is an OR operation; and converting a value of the condition flag from the processing element, the value corresponding to a bit value of the condition flag mask register, into a second logical value, when the logical operation performed by the condition flag arithmetic operator is an AND operation.

6. The arithmetic operation processing method according to claim 5, further comprising:

executing a conditional branch based on the operation result transferred from the condition flag arithmetic operator.

7. An arithmetic operation processing method used in an apparatus which includes a plurality of processing elements and a condition flag arithmetic operator to process multiple data in parallel in accordance with a single instruction, each of the plurality of processing elements including at least one condition flag register, each of which retains a condition flag, a data supply operable to supply data, and a data storage operable to store an operation result of the data, the arithmetic operation processing method comprising:

performing an arithmetic operation in which the plurality of processing elements perform a common arithmetic operation based on an evaluation result of an instruction stored in an instruction register, and performing a condition flag arithmetic operation in which the condition flag arithmetic operator selectively performs one of a logical operation and a comparison operation on the condition flag retained in each processing element, and transfers the operation result to each of the plurality of processing elements, wherein each of the plurality of processing elements updates the condition flag based on the operation result, and the operation result is common to the plurality of processing elements, performing a predetermined arithmetic operation on the data supplied by the data supply, and transferring the operation result to the data storage and the at least one condition flag register;

selecting one of the operation results transferred from the condition flag arithmetic operator and the arithmetic operator, and transferring the selected operation result to the at least one condition flag register; and selecting one of register values from the at least one condition flag register, and transferring the selected register value to the data storage and the condition flag arithmetic operator.

8. An arithmetic operation processing method used in an apparatus which includes a plurality of processing elements and a condition flag arithmetic operator to process multiple data in parallel in accordance with a single instruction, each of the plurality of processing elements including at least one condition flag register, each of which retains a condition flag, and a data recorder operable to supply data and to store an operation result of the data, the arithmetic operation processing method comprising:

performing an arithmetic operation in which the plurality of processing elements perform a common arithmetic operation based on an evaluation result of an instruction stored in an instruction register, and performing a condition flag arithmetic operation in which the condition flag arithmetic operator selectively performs one of a logical operation and a comparison operation on the condition flag retained in each processing element, and transfers the operation result to each of the plurality of processing elements, wherein each of the plurality of processing elements updates the condition flag based on the operation result, and the operation result is common to the plurality of processing elements, performing a predetermined arithmetic operation on the data supplied by the data recorder, and transferring the operation result to the data recorder and to the at least one condition flag register;

selecting one of the operation results transferred from the condition flag arithmetic operator and the arithmetic operator, and transferring the selected operation result to the at least one condition flag register; and selecting one of register values from the at least one condition flag register, and transferring the selected register value to the data recorder and the condition flag arithmetic operator.

* * * * *